(12) United States Patent
Lev et al.

(10) Patent No.: US 11,177,934 B2
(45) Date of Patent: Nov. 16, 2021

(54) OPEN PROCESSOR FOR OPERATION TECHNOLOGY AND INTERNET OF THINGS

(71) Applicant: NEC Corporation Of America, Herzlia (IL)

(72) Inventors: Tsvi Lev, Tel-Aviv (IL); Yaacov Hoch, Ramat-Gan (IL); Moshe Karako, Kiryat-Ono (IL)

(73) Assignee: NEC Corporation Of America, Herzlia (IL)

( * ) Notice: Subject to any disclaimer, the term of this patent is extended or adjusted under 35 U.S.C. 154(b) by 205 days.

(21) Appl. No.: 16/431,757

(22) Filed: Jun. 5, 2019

(65) Prior Publication Data
US 2020/0389288 A1 Dec. 10, 2020

(51) Int. Cl.
*H04L 9/00* (2006.01)
*G06F 21/74* (2013.01)
*H04L 9/32* (2006.01)

(52) U.S. Cl.
CPC .............. *H04L 9/006* (2013.01); *G06F 21/74* (2013.01); *H04L 9/3247* (2013.01); *H04L 9/3297* (2013.01)

(58) Field of Classification Search
CPC ...... H04L 9/006; H04L 19/3297; G06F 21/74
See application file for complete search history.

(56) References Cited

U.S. PATENT DOCUMENTS

| | | | | |
|---|---|---|---|---|
| 8,892,451 | B2 * | 11/2014 | Everett | G06Q 10/0833 705/4 |
| 9,356,916 | B2 * | 5/2016 | Kravitz | H04L 63/061 |
| 10,185,999 | B1 * | 1/2019 | Konrardy | G07C 5/008 |
| 10,872,155 | B2 * | 12/2020 | Oh | G06F 21/64 |
| 10,958,433 | B2 * | 3/2021 | Medvinsky | H04L 9/0822 |
| 11,023,602 | B2 * | 6/2021 | Chaiken | H04L 9/3297 |
| 11,030,280 | B2 * | 6/2021 | Asanghanwa | G06F 21/64 |
| 2017/0180340 | A1 * | 6/2017 | Smith | H04W 4/70 |
| 2018/0006829 | A1 * | 1/2018 | Kravitz | H04W 12/06 |
| 2018/0144147 | A1 * | 5/2018 | Nix | H04L 9/006 |
| 2018/0349646 | A1 * | 12/2018 | Perone | G06F 11/1441 |
| 2019/0036706 | A1 * | 1/2019 | Detert | G06F 21/73 |
| 2019/0044738 | A1 * | 2/2019 | Liu | H04W 4/46 |
| 2019/0097793 | A1 * | 3/2019 | Nix | H04L 9/006 |
| 2019/0104415 | A1 * | 4/2019 | Gehrmann | H04W 12/108 |
| 2019/0114428 | A1 * | 4/2019 | Kim | G06F 21/74 |
| 2019/0140849 | A1 * | 5/2019 | Kravitz | H04L 9/0819 |
| 2020/0007346 | A1 * | 1/2020 | Callan | H04L 9/0643 |
| 2020/0104491 | A1 * | 4/2020 | Boulton | G06F 21/577 |
| 2020/0358619 | A1 * | 11/2020 | Ding | H04L 9/0852 |

* cited by examiner

Primary Examiner — Viral S Lakhia

(57) ABSTRACT

A computing device comprises a network element configured for receiving messages sent over a network from a control facility, a reduced instruction set computer processing circuitry comprising a central processing unit (CPU) and a secure hardware-implemented module adapted to verify that a signed PKI message is encoded in the received messages at a plurality of sequential intervals and to either switch the CPU from an operational state to a safe state, or prevent switching of the CPU from the safe state to the operational state, when a receipt of a signed PKI message is not verified in one of the sequential intervals. In the operational state, the CPU accesses a memory address space in the processing circuitry for executing software-based commands. In the safe state the CPU is prevented from executing the software-based commands while access to the memory address space is retained.

15 Claims, 2 Drawing Sheets

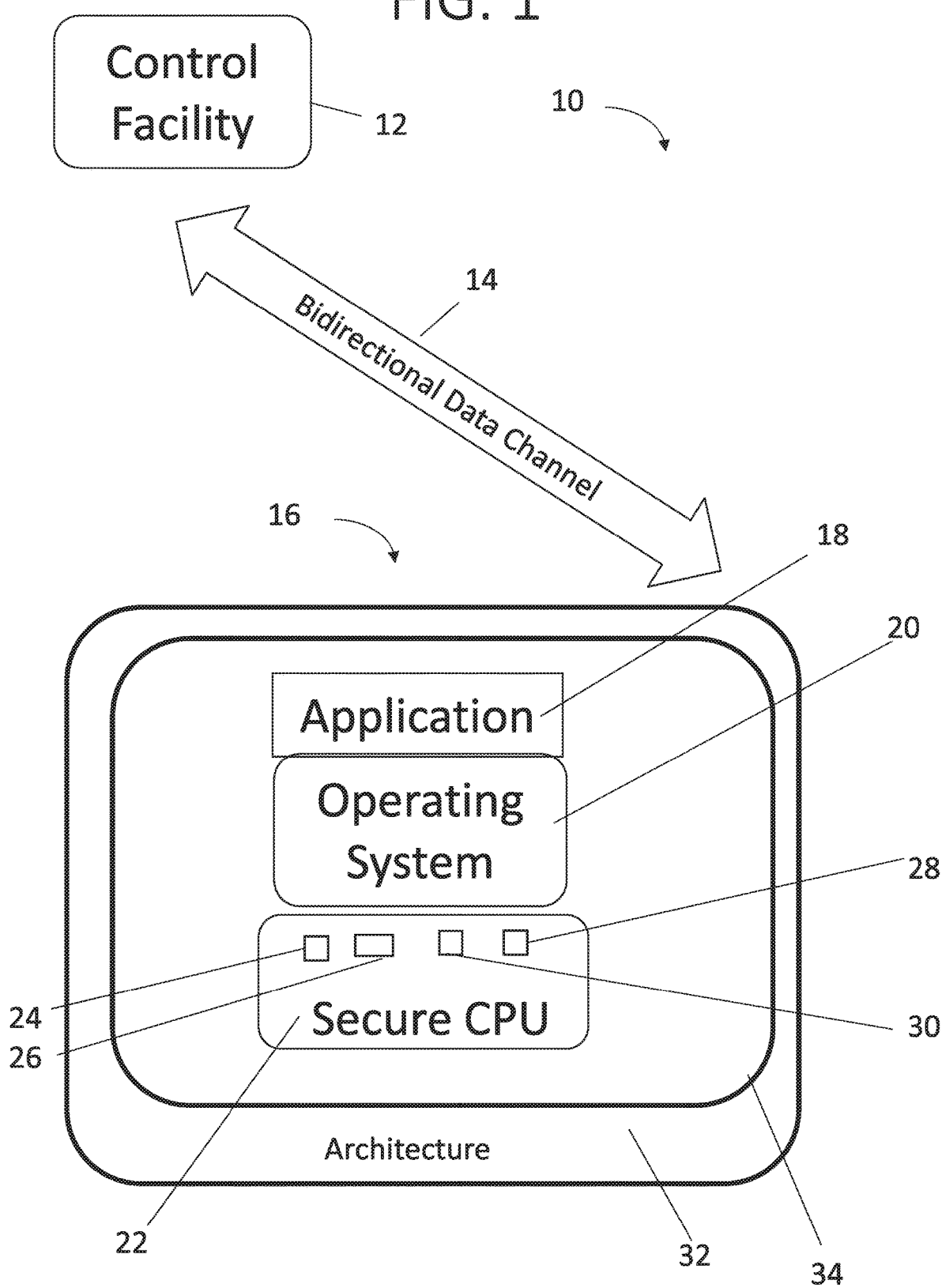

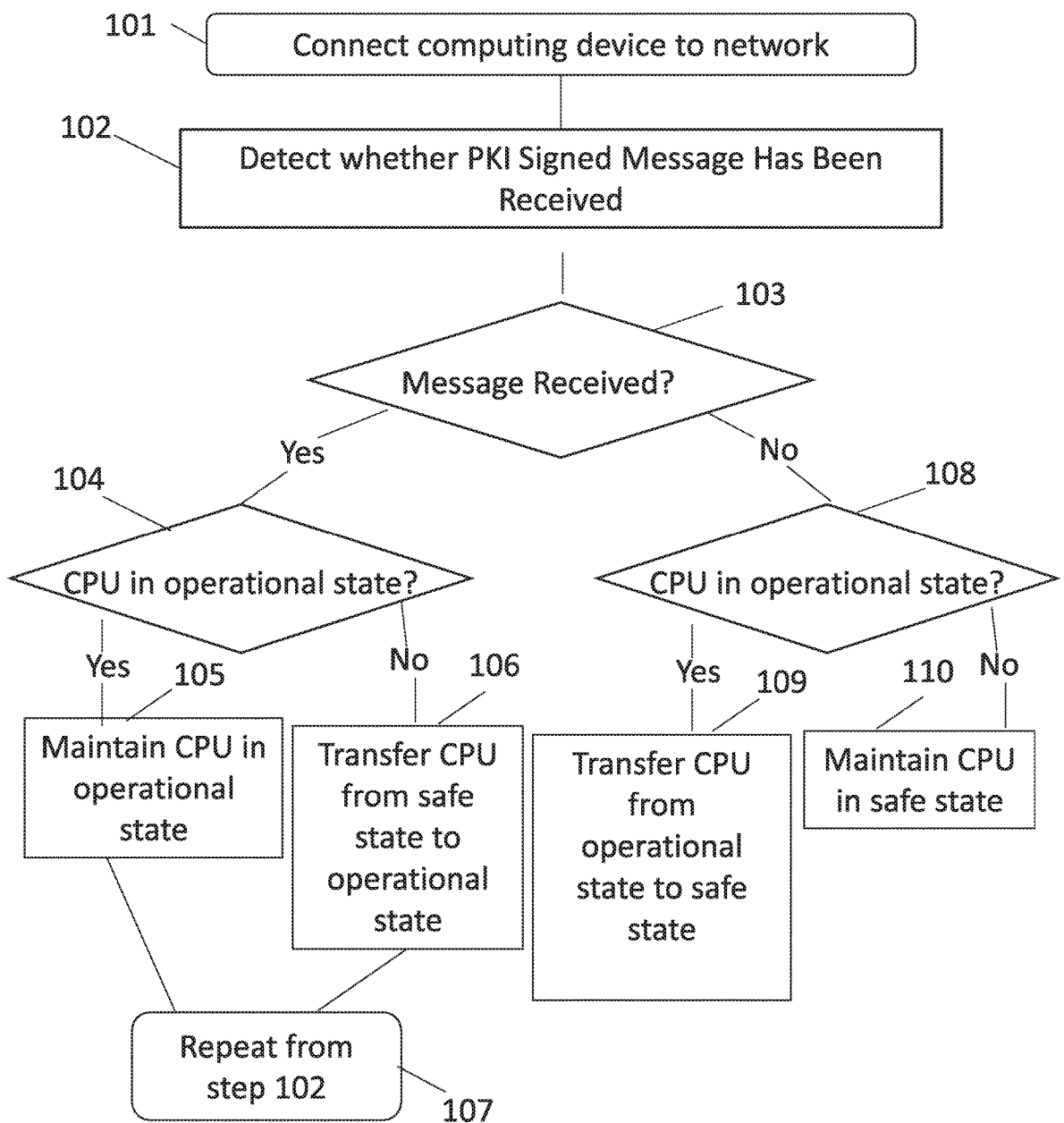

OPEN PROCESSOR FOR OPERATION TECHNOLOGY AND INTERNET OF THINGS

FIELD AND BACKGROUND OF THE INVENTION

The present invention, in some embodiments thereof, relates to an open processor, but not exclusively, to an open processor suitable for networked devices such as computers or internet of things (JOT) devices.

Various solutions currently exist for protecting networked devices from intrusion by malware, viruses, or the like. The most common approach is to add protect the networked device with detection or prevention solutions, such as software.

The software-based solution has several drawbacks. First, especially in the case of large networks, it can be very expensive and time-consuming to understand the existing information technology (IT) and operations technology (OT) layout, to determine the nature of each networked device, to adapt, and to configure the solutions. Furthermore, if an attack does succeed, the main solution is to disconnect the suspect machine from the network (e.g., via software-defined networking (SDN)), or physically shut the machine down, restart, and handle when disconnected. This methodology is time-consuming and inefficient.

In addition, any software-based "watchdog" or "override" mechanism is a problem, because it may be attacked as well. Even firmware can be reflashed.

SUMMARY OF THE INVENTION

It is an objective of this invention to devise a new solution for protecting networked devices that avoids the above-described drawbacks. It is a further objective of this invention to provide a hardware-based solution for protecting networked devices, in which the networked devices may enter a safe state while maintaining communication with a control facility. It is a further objective of this invention to develop the hardware-based solution with an open-source instruction set architecture, so as to remove the possibility of hidden security flaws.

According to a first aspect, a computing device comprises a network element configured for receiving messages sent over a network from a control facility, a reduced instruction set computer processing circuitry comprising a central processing unit (CPU) and a secure hardware-implemented module adapted to verify that a signed PKI message is encoded in the received messages at a plurality of sequential intervals and to either switch the CPU from an operational state to a safe state, or prevent switching of the CPU from the safe state to the operational state, when a receipt of a signed PKI message is not verified in one of the sequential intervals. In the operational state, the CPU accesses a memory address space in the processing circuitry for executing software-based commands. In the safe state, the CPU is prevented from executing the software-based commands while access to the memory address space is retained.

Advantageously, the system provides a hardware-based solution for protecting network devices. Furthermore, the computing device is able to maintain communication with the control facility even when in the safe state, thus precluding the drawbacks associated with disconnecting the computing device from the network.

In another implementation according to the first aspect, the reduced instruction set computer comprises open-source instruction set architecture. Advantageously, the open-source architecture forestalls the possibility of hidden security flaws, because then the design can be reviewed by anyone.

In another implementation according to the first aspect, the reduced instruction set computer comprises the RISC-V instruction set architecture. Advantageously, use of the RISC-V architecture is widespread, and thus the open source architecture will be compatible with many existing systems.

In another implementation according to the first aspect, the processing circuitry runs the at least one computing device in a virtualized mode. Advantageously, the secure hardware implemented module need not be included in the base architecture of the computing device, and may thus be overlaid in a virtualized layer over the processing circuitry of a preexisting computing device.

In another implementation according to the first aspect, the secure hardware implemented module detects the PKI signed message in a specified address range in a CPU register. Advantageously, the use of a specified address range in the CPU register allows for allows for the programming of the module to be easily detected and evaluated.

In another implementation according to the first aspect, the secure hardware implemented module is configured to receive instructions from the control facility via the network when in the safe state. Advantageously, a user or administrator may thus exercise control over the CPU from afar, without disconnecting the computing device from the network.

In another implementation according to the first aspect, the PKI signed message is signed with a time stamp and with a unique identifier of the CPU. Advantageously, use of a time stamp and unique identifier helps ensure that the PKI signed message cannot be sent from an alternative source other than the control facility.

According to a second aspect, a method comprises connecting a computing device to a control facility via a network. The computing device comprises a network element configured for receiving messages sent over the network from the control facility, a reduced instruction set computer processing circuitry comprising a central processing unit (CPU) and a secure hardware-implemented module, and the CPU comprises an operational state, in which the CPU accesses a memory address space in the processing circuitry for executing software-based commands, and a safe state, in which the CPU is prevented from executing the software-based commands while access to the memory address space is retained. The method further comprises verifying with the secure hardware-implemented module whether a PKI signed message transmitted to the computing device from the control facility has been received by the CPU. If the secure hardware-implemented module verifies that the PKI signed message has been received by the CPU within a sequential interval, and the CPU is in the operational state, the method comprises maintaining the CPU in the operational state, and repeating the verifying step. If the secure hardware implemented module does not verify that the PKI signed message has been received by the CPU within the sequential interval, and if the CPU is in the safe state, the method comprises switching the CPU from the safe state into the operational state; and repeating the verifying step. If the secure hardware implemented module does not verify that the PKI signed message has been received by the CPU within the sequential interval, and the CPU is in the safe state the method comprises maintaining the CPU in the safe state.

Advantageously, the method provides a hardware-based solution for protecting network devices. Furthermore, the computing device is able to maintain communication with the control facility even when in the safe state, thus precluding the drawbacks associated with disconnecting the computing device from the network.

In another implementation according to the second aspect, the reduced instruction set computer comprises open-source instruction set architecture. Advantageously, the open-source architecture forestalls the possibility of hidden security flaws, because then the design can be reviewed by anyone.

In another implementation according to the second aspect, the reduced instruction set computer comprises the RISC-V instruction set architecture. Advantageously, use of the RISC-V architecture is widespread, and thus the open source architecture will be compatible with many existing systems.

In another implementation according to the second aspect, the method comprises running the at least one computing device in a virtualized mode. Advantageously, the secure hardware implemented module need not be included in the base architecture of the computing device, and may thus be overlaid in a virtualized layer over the CPU of a preexisting computing device.

In another implementation according to the second aspect, the method further comprises transmitting instructions from the control facility to the CPU when the CPU is in the safe state. Advantageously, a user or administrator may thus exercise control over the CPU from afar, without disconnecting the computing device from the network.

In another implementation according to the second aspect, the verifying step comprises detecting the PKI signed message in a specified address range in a CPU register. Advantageously, the use of a specified address range in the CPU register allows for allows for the programming of the module to be easily detected and evaluated.

In another implementation according to the second aspect, the PKI signed message is signed with a time stamp and with a unique identifier of the CPU. Advantageously, use of a time stamp and unique identifier helps ensure that the PKI signed message cannot be sent from an alternative source other than the control facility.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic diagram of a system for remote communication between a control facility and a networked device including an open source processor, according to embodiments of the invention; and FIG. 2 is a flow chart illustrating a method of controlling a networked device with an open source processor, according to embodiments of the invention.

DETAILED DESCRIPTION OF SPECIFIC EMBODIMENTS OF THE INVENTION

The present invention, in some embodiments thereof, relates to an open processor, but not exclusively, to an open processor suitable for networked devices such as computers or internet of things (IOT) devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, system 10 includes control facility 12, bidirectional data channel 14, and networked device 16. Networked device 16 may be any device that may be connected to a network, such as a computer, mobile phone, or internet-of-things device. The networked device 16 may also be referred to as a computing device.

In the illustrated embodiment, networked device 16 is a super CPU-based computer running a programmable logic controller (PLC) in virtualized mode. The networked device includes base architecture 32 and virtualization layer 34 which is overlaid onto base architecture 34. The virtualization layer 34 includes at least one operating system 20, also referred to as a secure Central Processing Unit ("CPU" or "Secure CPU"), and a secure hardware-implemented module 22. In the illustrated embodiment, secure CPU 20 is encapsulated in the virtualization layer 34. Secure hardware-implemented module 22 may be an auxiliary system that serves as a coprocessor with secure CPU 20. For example, secure hardware implemented module 22 may be included in a removable drive, such as a USB drive. In other embodiments, the hardware of secure CPU 20 includes all the elements of secure hardware implemented module 22.

The illustrated embodiment depicts a single virtualized computing system. However, as will be recognized by those of skill in the art, networked device 16 may also be configured to run a plurality of virtualized systems, each with a secure CPU 22.

In addition, while the illustrated embodiment depicts networked device 16 running in virtualized mode, networked device 16 may also run on a base architecture 32 which includes secure CPU 20 and secure hardware implemented module 22, without any virtualization layer 34. Advantageously, and as is known to those of skill in the art, virtualization may be imperfect, and it may be possible in some instances to breach the underlying hardware even when the system is running in virtualized mode. In such circumstances, when the underlying hardware of base architecture 32 is compromised, then even if the hardware of virtualization layer 34 is secure, it may similarly be compromised. The data and instructions of the virtualized machine can then be accessed. Including the secure hardware implemented module 22 in the base architecture 32 precludes this possibility.

When the secure CPU 20 is physically in the system of networked device 16, a security-conscious user can then know for certain what is inside the secure CPU 20, down to every logic gate, and verify that the system is secure. Optionally, a user may even choose to produce the secure CPU 20 and/or the secure hardware implemented module coprocessor 22 herself in a foundry, with the design being open to all. Such a device would be considered more secure than virtualization over a standard commercial closed-source CPU design.

Secure CPU 20 may be a reduced instruction set computer (RISC) with processing circuitry. The processing circuitry may have memory address space, such as ROM or PROM. Secure hardware implemented module 30, in the depicted embodiment, includes PCB 24, memory 26, network interface controller (NIC) 28, and disk 30. The memory 26 may be read-only memory (ROM) or programmable read only memory (PROM). Secure CPU 20 controls the running of software application 18. Secure CPU 20 is configurable between two modes. The first mode is an operational state. In the operational state, the secure CPU 20 accesses a memory address space in the processing circuitry for executing software-based commands, and the secure CPU 20 may execute software-based commands to thereby run software application 18. The second mode is a safe state. The safe state is a trusted execution environment. While in the safe state, secure CPU 20 may not run software application 18. However, secure CPU 20 retains access to ROM/PROM address space, and can use it for data and program instructions. The secure CPU 20 also has access, while in the safe state, to all of the regular memory of networked device 16, and all the privileges of root access. The actual operations that the secure CPU 20 takes while in the safe state are coded in the ROM/PROM address space, and will enable the control facility 12 to contact, control, and interrogate the secure CPU 20.

Secure CPU 20 may be created using an existing design of a traditional CPU known to those of skill in the art, with the addition of secure hardware implemented module 22.

In one advantageous embodiment, the secure CPU 20 is an open-source CPU architecture. An open-source CPU architecture is advantageous because if a CPU based on a proprietary or closed design, it may still be suspect, as the design may have security loopholes or may be exposed to malicious back door attacks. An open-source CPU architecture, however, may be evaluated by any number of independent security analysts, companies, or academic experts. If some flaw is found, it may then be corrected or replaced.

One advantageous embodiment of an open-source CPU architecture is RISC-V. Advantageously, A RISC-V instruction set architecture may be incorporated with full Linux support. Companies also exist that turn such designs based on RISC-V into Application Specific Integrated Circuits (ASIC). Such designs may also be run as a field programmable gate array (FPGA), where the option to reflash the FPGA has been disabled. In this embodiment, secure CPU 20 may thus be produced at low costs, even for small quantities.

Secure CPU 20 could also theoretically be a commercial operating system, such as one produced by commercial companies such as Intel, ARM, or Qualcomm—so long as these processors' designs were open. While the simplicity of the RISC V instruction set and associated hardware designs is an important advantage for the verifiable security of the whole system, the security advantages associated with the system described herein would apply with any processor—so as long as these processors' designs were open. The openness is what makes systems based on them verifiable by third parties.

FIG. 2 illustrates a flow chart of a method 100 of controlling networked device 16, according to embodiments of the invention. At step 101, a computing device 16 is connected to a network. At step 102, the secure hardware implemented module 22 verifies whether a PKI signed message transmitted to the computing device 16 from the control facility has been received. The control facility 12 periodically sends a public key interface (PKI) signed message to each networked device 16 via network, or bidirectional channel, 14. Alternatively, the message may be an encrypted message with a symmetric key such as Advanced Encryption Standard (AES). The period may be any suitable time, such as a minute, a second, or a fraction of a second. In a preferred embodiment, the period is a number of milliseconds. Naturally, if there are some time critical operations the networked device 16 is expected to perform during the operational state, care should be taken in the ROM software design not to extend the period for too long, just as in real time driver design. The message may be signed with a time stamp or other non-repeating code. The message may also be signed with some unique identifier of the specific secure CPU 20 or secure hardware implemented module 22. The message may also include instructions or data.

Hardware implemented module 22 is programmed to periodically look for the PKI signed message, and confirm whether the PKI signed message has been received. The hardware implemented module 22 may be programmed to look for the PKI signed message in a certain address range in a memory or CPU register. Advantageously, the use of a specified address range may enable easy evaluation of the programming of the secure hardware implemented module 22 or CPU 20. At step 103, the secure hardware implemented module 22 is programmed to respond differently depending on whether the PKI signed message is received or not. In some embodiments, the secure hardware implemented module 22 creates a special self-interrupt every period, and causes the secure CPU 20 to enter the safe state on its own. In such embodiments, the secure CPU 20 stays in the safe state until it executes some instruction. The instruction may be, for example, confirming receipt of the PKI signed message. If the instruction is not executed, the secure CPU 20 will never return to the operational state. In other embodiments, the secure CPU 20 may move to the safe state only if it fails to receive the PKI signed message within a given period. If the secure hardware implemented module 22 does not find such a message with update time (meaning it was not sent, or the software application 18 the CPU 20 is running did not deliver it, or internet protocol (IP) communication was broken, etc.), then secure CPU 20 can halt, enter the special 'safe state' and await instructions on that same channel, but without continuing processing of the software based CPU commands.

Accordingly, as shown in step 104, a different result obtains depending on whether the secure CPU 20 is in the operational state when the PKI signed message was received. As shown in step 105, if the PKI signed message was received, and the secure CPU 20 is in the operational state, the secure CPU 20 is maintained in the operational state. By contrast, as shown in step 106, if when the PKI signed message is received, the secure CPU 20 was in the safe state, the secure CPU 20 is switched back to the operational state. Either way, at step 107, the transmission of the PKI signed message is repeated, in a theoretically indefinite loop.

If the outcome of step 103 is that the PKI signed message is not received, then, at step 108, a different result obtains based on whether the secure CPU 20 is in the operational state. If the secure CPU 20 is in the operational state, then, as shown in step 109, the secure CPU 20 is transferred from the operational state to the safe state. By contrast, as shown in step 110, if the secure CPU 20 is in the safe state, it is maintained in safe state. While in the safe state according to step 109 or 110, the secure CPU 20 may be configured to execute a predefined code. For example, the predefined code may instruct the secure CPU 20 to wait and execute some basic functions.

The system 10 and method 100 feature many benefits over known watchdog mechanisms, such as software-based mechanisms. First, any networked device 16 based on secure CPU 20 may always be shut down, halted, inspected, and reprogrammed remotely. It is not necessary to disconnect the networked device 16 from the network in order to address a potential security breach. In addition, the system 10 may be based on an open-source CPU, which is open for anyone to review, try, modify, and use. The use of open-source CPU may ensure that there are no security flaws in the secure CPU 20. Furthermore, regardless of the software application 18 and the configuration of the system 10, if the central control facility 12 wishes to gain control, it will gain control, and the secure CPU 20 will halt function of the networked device 16 and await further instructions.

System 10 may be initially set up as a fully integrated system, or may be overlaid onto an existing network. In the example of a fully integrated system, the secure CPU 20 is overlaid onto architecture 30 and incorporated into a computer box prior to sale of the networked device 16. In such instances, the customer (i.e., the purchaser of networked device 16) may also be provided with a full open code of super CPU 20, in order to enable independent review. The end customer may also be provided with the open-source software for control facility 12. Alternatively, the system 10 is overlaid onto an existing operations technology system. In such a scenario, networked device 16 may be a personal computer. A general purpose box, such as a Linux box, using the secure CPU 20, runs the networked device 16, in virtualized mode. The Linux box and virtualization may then be ported to a customer (i.e., the purchaser of secure CPU 20). The software for the control facility 12, which is open source, may also be ported to the customer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant open-source CPUs and secure messaging methods will be developed and the scope of the terms CPU, open-source, and PKI signed message is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computing device comprising:
    a network element configured for receiving messages sent over a network from a control facility;
    a reduced instruction set computer processing circuitry comprising a central processing unit (CPU) and a secure hardware-implemented module;
    wherein said secure hardware-implemented module of said computing device is adapted to verify that a signed PKI message is encoded in the messages received by said CPU and sent from said control facility, at a plurality of sequential intervals and is further adapted to switch the CPU from an operational state to a safe state when the CPU is in operational state and a receipt of the signed PKI message is not verified by said secure hardware-implemented module, in one of the sequential intervals, and to prevent switching of the CPU from the safe state to the operational state when the CPU is in safe state and a receipt of the signed PKI message is not verified by said secure hardware-implemented module, in one of the sequential intervals; and
    wherein in the operational state the CPU accesses a memory address space in the processing circuitry for executing software-based commands, and wherein in the safe state the CPU is prevented from executing the software-based commands while access to the memory address space is retained;
    wherein the secure hardware-implemented module detects the PKI signed message in a specified address range in a CPU register.

2. The computing device of claim 1, wherein the reduced instruction set computer comprises open-source instruction set architecture.

3. The computing device of claim 2, wherein the reduced instruction set computer comprises RISC-V instruction set architecture.

4. The computing device of claim 1, wherein the processing circuitry runs the at least one computing device in a virtualized mode.

5. The computing device of claim 1, wherein the secure hardware implemented module is configured to receive instructions from the control facility via the network when in the safe state.

6. The computing device of claim 1, wherein the PKI signed message is signed with a time stamp and with a unique identifier of the CPU.

7. The computing device of claim 1, wherein the PKI signed message is signed with a unique identifier of the secure hardware-implemented module.

8. A method comprising:
    (a) connecting a computing device to a control facility via a network, wherein the computing device comprises a network element configured for receiving messages sent over the network from the control facility, a reduced instruction set computer processing circuitry comprising a central processing unit (CPU) and a secure hardware-implemented module, and the CPU comprises an operational state, in which the CPU accesses a memory address space in the processing circuitry for executing software-based commands, and a safe state, in which the CPU is prevented from executing the software-based commands while access to the memory address space is retained;
    (b) verifying by the secure hardware-implemented module of the computing device whether a PKI signed message transmitted to the computing device from the control facility has been received by the CPU;
    (c) if the secure hardware-implemented module verifies that the PKI signed message has been received by the CPU from the control facility within a sequential interval:

(i) if the CPU is in the operational state, maintaining the computing device in the operational state, and repeating step (b);
(ii) if the CPU is in the safe state, causing the computing device, by the secure hardware-implemented module, to switch from the safe state into the operational state, and repeating step (b);
(d) if the secure hardware implemented module does not verify that the PKI signed message sent by the control facility, has been received by the CPU within the sequential interval:
(i) if the CPU is in the operational state, causing the CPU, by the secure hardware-implemented module, to switch from the operational state to the safe state,
(ii) if the CPU is in the safe state, maintaining the CPU in the safe state and preventing the CPU, by said secure hardware-implemented module from switching from the safe state to the operational state;
wherein the PKI signed message is in a specified address range in a CPU register.

9. The method of claim 8, wherein the reduced instruction set computer comprises open-source instruction set architecture.

10. The method of claim 8, wherein the reduced instruction set computer comprises RISC-V instruction set architecture.

11. The method of claim 8, further comprising running the at least one computing device in a virtualized mode.

12. The method of claim 8, further comprising receiving instructions from the control facility via the network when the secure hardware-implemented module is in the safe state.

13. The method of claim 8, wherein step (b) comprises detecting the PKI signed message in a specified address range in a CPU register.

14. The method of claim 8, wherein the PKI signed message is signed with a time stamp and with a unique identifier of the CPU.

15. The method of claim 8, wherein the PKI signed message is signed with a unique identifier of the secure hardware-implemented module.

* * * * *